United States Patent [19]

Migliorato et al.

[11] Patent Number: 4,834,505
[45] Date of Patent: May 30, 1989

[54] MATRIX ADDRESSABLE DISPLAYS

[75] Inventors: Piero Migliorato, London; Michael G. Clark, Buckinghamshire, both of England

[73] Assignee: The General Electric Company, p.l.c., England

[21] Appl. No.: 116,561
[22] PCT Filed: Feb. 13, 1987
[86] PCT No.: PCT/GB87/00104
   § 371 Date: Oct. 16, 1987
   § 102(e) Date: Oct. 16, 1987
[87] PCT Pub. No.: WO87/05141
   PCT Pub. Date: Aug. 27, 1987

[30] Foreign Application Priority Data

Feb. 21, 1986 [GB] United Kingdom ............... 8604402

[51] Int. Cl.[4] ................................................ G02F 1/13
[52] U.S. Cl. ............................... 350/333; 350/334
[58] Field of Search ............... 350/334, 339 F, 333

[56] References Cited

U.S. PATENT DOCUMENTS

| | | | |
|---|---|---|---|
| 3,863,332 | 2/1975 | Leupp et al. | 350/344 |
| 4,410,887 | 10/1983 | Stolov et al. | 350/339 F |
| 4,589,733 | 5/1986 | Yaniv et al. | 350/333 |
| 4,608,558 | 8/1986 | Amstutz et al. | 340/784 |
| 4,632,514 | 12/1986 | Ogawa et al. | 350/339 F |
| 4,716,403 | 12/1987 | Morozumi | 350/339 F |
| 4,753,518 | 6/1988 | Clerc | 350/333 |

FOREIGN PATENT DOCUMENTS

| | | |
|---|---|---|
| 0167408 | 1/1986 | European Pat. Off. |
| 0202992 | 11/1986 | European Pat. Off. |
| 8502931 | 7/1985 | World Int. Prop. O. |

OTHER PUBLICATIONS

Bernard J. Lechner et al, "Liquid Crystal Matrix Displays", *Proceedings of the IEEE*, vol. 59, No. 11, Nov. 1971, pp. 1566–1579.

Primary Examiner—Stanley D. Miller
Assistant Examiner—Anita E. Pellman
Attorney, Agent, or Firm—Kirschstein, Ottinger, Israel & Schiffmiller

[57] ABSTRACT

An electro-optic display comprises a two dimensional array of liquid crystal cells (C11A,B to C44A,B) each switchable by means of electrical signals applied to respective pairs of address lines connected to the cell by respective transistors (T11-T44). Each main electrode of each transistor is isolated from the rest of the array by a respective cell of the array.

19 Claims, 11 Drawing Sheets

MATRIX ADDRESSABLE DISPLAYS

BACKGROUND OF THE INVENTION

1. Field of the Invention

This invention relates to matrix addressable displays. In particular the invention relates to matrix addressable displays of the kind comprising a two dimensional array of switchable cells, each cell having two electrodes each carried on a surface of a respective one of two plates, each cell being switchable by means of electrical signals applied to a respective pair of electrical address lines connected to the cell, each address line within a pair being connected to a different plurality of cells within the array.

2. Description of Related Art to overcome the problems of multiplexing the address lines in such a display, i.e. in order to identify uniquely the cell to be switched at any one time and prevent partial switching of other cells connected to one of the pair of address lines, it is known to connect each cell to its respective pair of address lines via a respective transistor, for example, a thin film transistor, i.e. the so-called 'active matrix addressing' approach. FIG. 1 is a schematic circuit diagram of part of such a known display.

Referring to FIG. 1, the illustrated part of the display comprises an array of liquid crystal cells C11 to C22, each cell being represented in the figure as a capacitor. One electrode 3 of each cell is carried on the inner surface of a first insulating plate, this plate being transparent, the electrode 3 being the size of a pixel of the display, and being made of a transparent conductor such as indium tin oxide. The other electrode 5 of each cell is defined on the opposing surface of a second insulating plate, this surface carrying a series of parallel conductive column tracks 7, 9, 11 all components carried on this second plate being shown dotted in the figure.

In respect of each cell, there is provided a respective n channel thin film field effect transistor T11 to T22 carried on the first plate. One main electrode of each transistor, hereinafter referred to as a drain for convenience, is connected to the electrode 3 of each cell, whilst the gate of each transistor is connected to a selected gate address line 13, 15, 17 within a series of parallel conductive row tracks on the first plate. The second main electrode of the transistor hereafter referred to as the source for convenience, is connected to an earth line in the form of a family of conductive row tracks 19, 21 extending across the first plate paralle to the gate address lines 13, 15, 17.

In the use of the display, appropriate synchronised gate and source voltage pulses are applied to a selected pair of gate and source address lines. This then selectively addresses the one transistor which is connected to both the selected address lines. The capacitor constituted by the cell connected to the selected transistor is then able to charge up to the voltage required to give a response in the liquid crystal cell, the capacitor then being isolated when the transistor is subsequently switched off, the charge held on the capacitor being effective to switch the cell in the sense of changing the reflectivity of the liquid crystal and thus producing the required pixel image.

Such a display, however, suffers the disadvantage that a single short in a transistor gate results in the failure of the entire row of the display to which the shorted transistor belongs even a single row failure being totally unacceptable in a display. Such row failures could be turned into single pixel failure by identifying and disconnecting faulty transistors, single pixel failures being much less noticeable and thus tolerable in some applications. This process is however time consuming and expenxive particularly for large numbers of pixels.

The above known display present another problem also. Due to photolithographic defects, dust particles and similar faults, shorts may occur between adjacent pairs of gate and drain lines which are carried on the same plate as the transistors, this leading to electrical interference between adjacent rows of the display. In order to ease this problem, the spacing between adjacent address lines must be relatively large, and thus useful display space is wasted and the maximum achievable resolution is limited.

SUMMARY OF THE INVENTION

It is an object of the present invention to provide an addressable matrix display of the kind specified, in which each switchable cell is addressed via a respective transistor but wherein the above problems are at least alleviated.

According to the present invention an addressable matrix display comprising a two dimensional array of switchable cells, each cell having two electrodes each carried on a surface of a respective one of two plates, each cell being switchable by means of electrical signal applied to a respective pair of electrical address lines connected to the cell by a transistor line within a pair being connected to a different plurality of cells within the array and being carried on a different one of the plates, is characterised in that each main electrode of each transistor is isolated from the rest of the array by a respective cell of the array.

Each cell is suitably a liquid crystal cell.

BRIEF DESCRIPTION OF THE DRAWINGS

Five matrix addressable display in accordance with the invention will now be described, by way of example only, with reference to FIGS. 2 to 22 of the accompanying drawings in which.

DETAILED DESCRIPTION OF THE PREFERRED EMBODIMENTS

Figure 1:
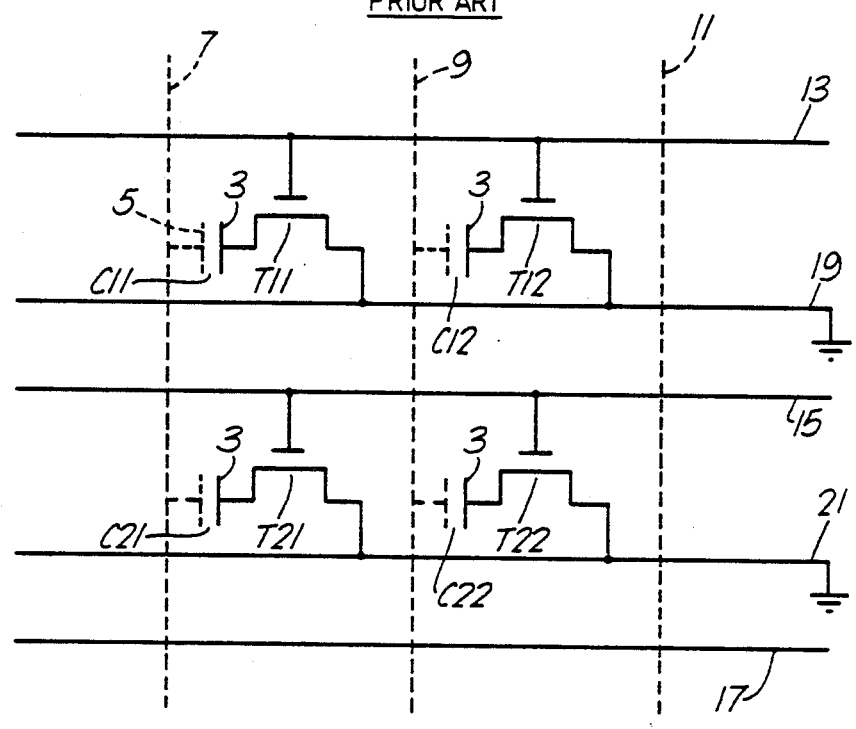
Figure 2:
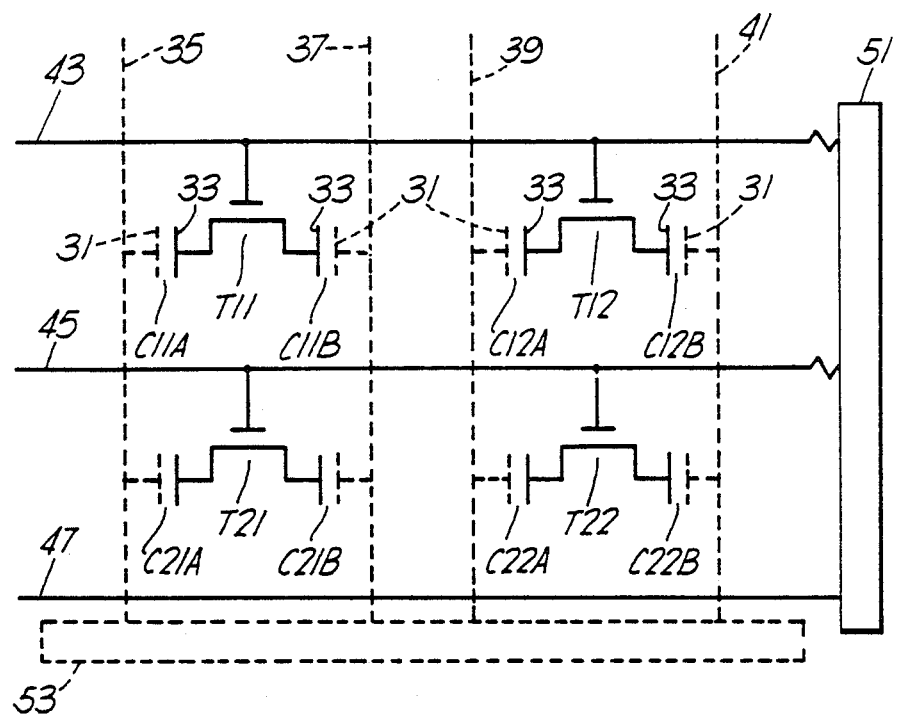
FIG. 2 is a schematic circuit diagram of the first display.

Referring firstly to FIG. 2, as in the prior art display described herebefore with reference to FIG. 1, the display comprises an array of liquid crystal cells C11A, C11B, C12A, C12B, C21A, C22B---represented as capacitors, only eight such cells being shown for the sake of clarity, although it will be appreciated that a practical display will have typically up to 2000×1200 cells or more. The electrodes 31, 33 of each cell are formed on the opposing surfaces of a pair of parallel transparent insulating plates, all components carried on the second plate being shown dotted. As in the prior art display the second plate carries a number of parallel conductive column tracks 35, 37, 39, 41 these being orthogonal to a number of parallel conductive gate lines 43, 45, 47 carried on the first plate, each cell having one electrode 31 connected to one column track 35, 37, 39, 41 and one electrode 33 connected via a transistor to one gate address line 43, 45, 47, 49. Unlike the prior art display however the electrodes 33 of each pair of two adjacent cells C11A and C11B etc in a row which are carried on the first plate are connected to the drain and source of the same transistor T11 etc. Respective peripheral driver circuits 51, 53 effective to provide drive voltages to the address lines 43, 45, 47 on the first plate, and 35, 37, 39, 41 on the second plate are also provided. It will seen that unlike the prior art display shown in FIG. 1, the nominal sources of different transistors in a row are separated by the liquid crystal cells connected to that row. Thus in the event of a short beween a transistor gate and source and drain the gate line will remain isolated from the rest of the circuit by the high impedance of the pair of liquid crystal cells directly connected to that transistor. This will allow the other transistors in the row to be driven, thus limiting the failure to that pair of cells which are connected to the failed transistor. It will also be seen that as only one set of address lines, i.e. the gate address line 43, 45, 47 for each row of pixel is carried on the plate carrying the transistors, these lines will be separated by a distance corresponding to at least the vertical dimension of the pixel. Thus the probability of shorting abjacent conductive tracks on the plate carrying the transistors is greatly reduced over the prior art display for a similar resolution display of the same area.

It will be appreciated that even if the fabrication yield for the second plate decreases as a result of the increased complexity with respect to the prior art second plate, this will be by far offset by the increase in the yield for the first plate which remains the more complex and expensive item due to the fact that it carries the transistors.

It will also be appreciated that for the above reasons it is also easier to connect the peripheral driver circuit 51 for the display to the gate line. The preipheral driver circuits 51, 53 can be connected to both plates through edge connectors or by mounting chips around the periphery of each plate with soldered contacts on the gate lines on the first plate and on the column tracks on the second plate. It can be convenient in some circumstances however to arrange for alternate column tracks 35, 39 to extend beyond the connectors or driving chips connected to the remaining tracks 37, 41. Although it may be convenient in some circumstances to address each column individually, it may be preferable in other cases to link one set of alternate columns together. This can be done by providing a bus bar connecting the said set of alternate columns, the bus bar crossing over or under the remaining columns. It should, however, be appreciated that even in this case the number of overlapping regions that are potential sources of shorts is greatly reduced with respect to known displays.

It will be appreciated that the peripheral drivers may be replaced by thin film transistors fabricated in a manner similar to the transistors used to switch the cells of the array.

Figure 3:
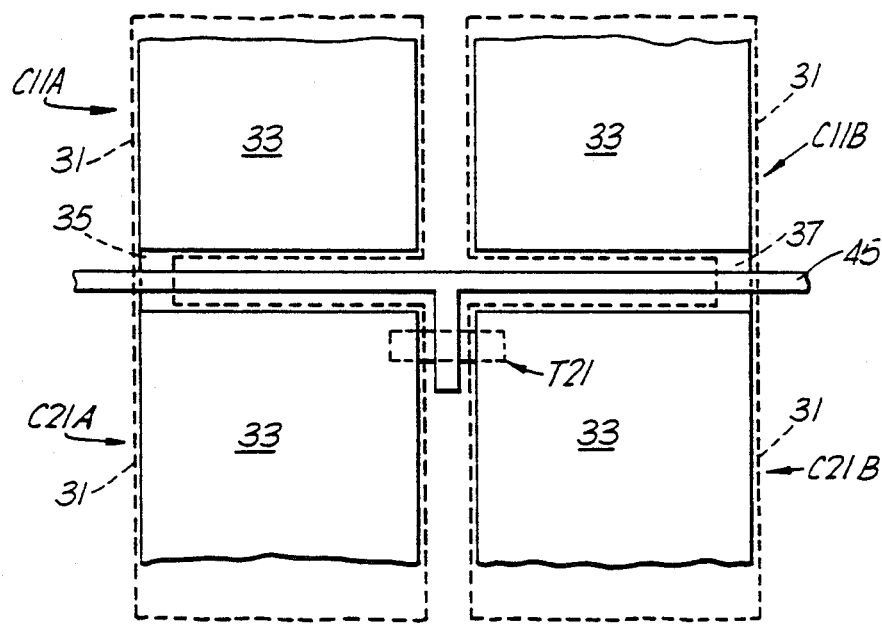
FIG. 3 is a schematic plan view of the circuit elements of part of the first display.

FIG. 3, illustrates a suitable practical configuration of the array. As shown the column tracks eg 35, 37 in FIG. 3, are made narrower where they cross a gate line, e.g. 45 in FIG. 3 to reduce the capacitive coupling between column tracks and gate lines.

Figure 4:
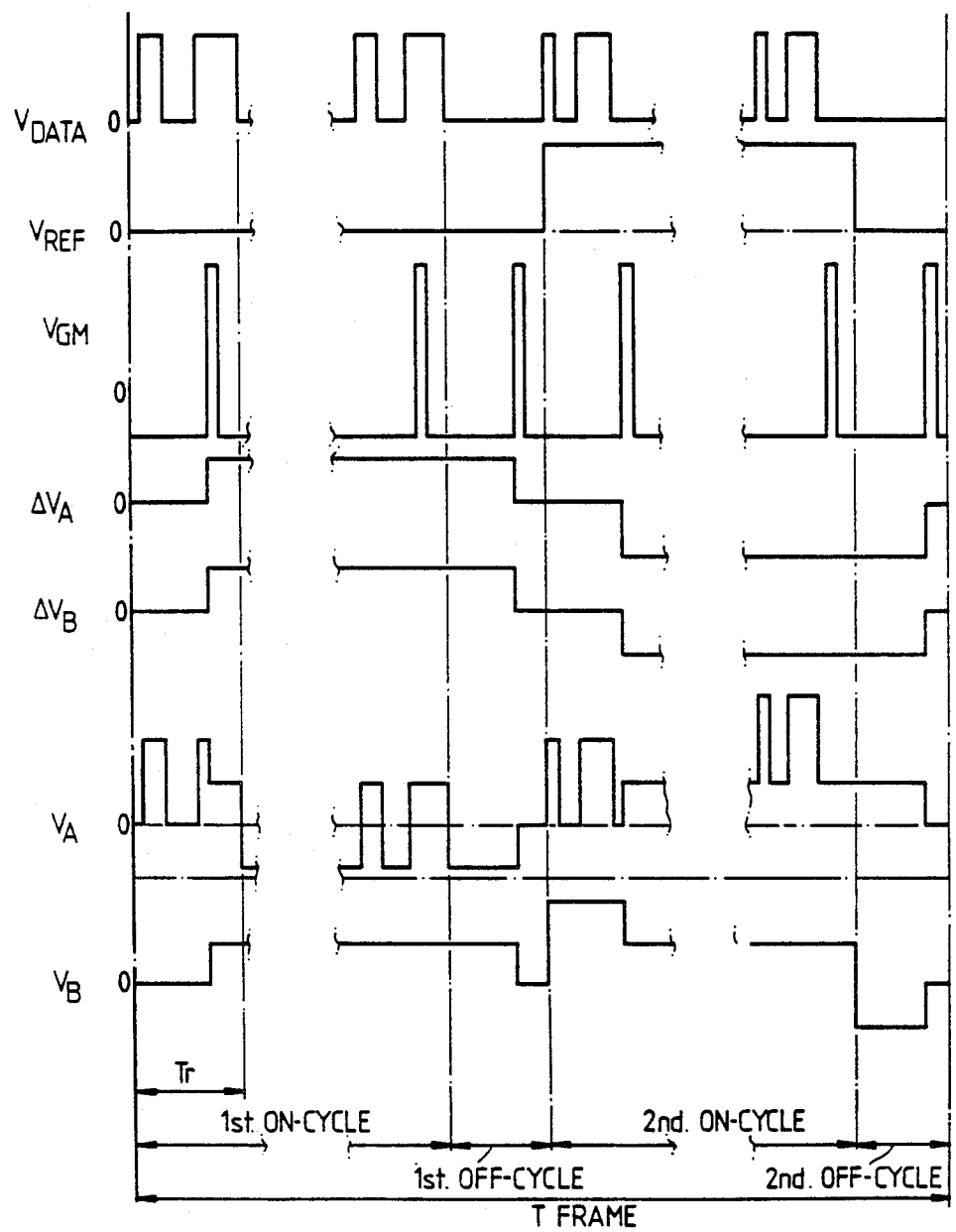
FIG. 4 illustrates a first voltage waveform scheme applicable to the first display.

Referring now also to FIG. 4, in use of the display the peripheral driver circuits 51, 53 are used to apply electrical signals to the various conductive tracks. Each row of the array is sequentially addressed by a respective series of strobe pulses $V_{GM}$ applied to each gate line 43, 45, 47, the series being temporally offset. $V_{DATA}$, $V_{REF}$ denote the voltage waveforms, with repect to earth applied to one particular pair of source and drain lines, for example 35, 37 carried on the second plate, $\Delta V_A$ and $\Delta V_B$ being the voltage drops across the respective cells C11A, C11B connected to these lines, it being appreciated that corresponding signals will be applied simultaneously to all the source and drain lines across the array, such that the pixels within each row of the array are simultaneously addressed. The voltages with respect to earth appering at the electrodes 33 carried on the first plate of these cells C11A, C11B are denotes $V_A$, $V_B$.

Thus, where the transistor T11 is an n - channel transistor $$V_A = V_{DATA} - \Delta V_A$$

$$V_B = V_{REF} + \Delta V_B$$

The time $T_{frame}$ taken to address each cell C11 to C22 within the array will consist of two on-cycles alternated with two off-cycles, each on-cycle being of duration $MT_r$ where M is an integer, and $T_r$ is the cell refresh time, the value of M being selected taking into account such factors as the characteristics of the transistors, liquid crystal material, and the speed of the driving electronics, the waveforms applied during these periods being described hereafter. Each off-cycle is of duration $T_r$, the function of the off-cycle being to reduce the maximum voltage between nominal source and nominal drain of each transistor after each on-cycle, these voltages otherwise resulting in high leakage currents, and eventually in the breakdown of the transistor. It will be appreciated however that the off-cycles can be omitted in some circumstances dependent on the characteristics of the transistors.

Within each on-cycle $V_{DATA}$ consists of a series of pulses, synchronised with the leading edge of a strobe pulse $V_{GM}$ which causes the transistor $T_{11}$ to conduct. This is followed by an off-cycle in which both $V_{DATA}$ and $V_{REF}$ are at zero potential, the strobe $V_{GM}$ applied during this period enabling both cells $C_{11A}$, $C_{11B}$ to discharge. In the subsequent on-cycle, $V_{DATA}$ consists of a series of pulses which are the complement of those in the first on-cycle and which are again synchronised with the leading edge of a strobe pulse $V_{GM}$, the waveforms in the second off cycle being the same as in the first off-cycle. During the first on-cycle and the first off-cycle $V_{REF}$ is zero, $V_{REF}$ being pulsed to a value of $2V_{MAX}$ during the second on-cycle. Thus it will be seen that in the first on-cycle $V_{REF}$ is always equal to 0 and $V_{DATA}$ is either $2V_{MAX}$ or 0 dependent on whether the cells C11A, C11B are selected or unselected where $V_{MAX}$ is the voltage required to switch the cell fully on. In the second on-cycle $V_{REF}$ is equal to $2V_{MAX}$ and $V_{DATA}$ is either 0 if the cells C11A, C11B are selected, or $2V_{MAX}$ if these cells are unselected. Thus the cells which are selected will be charged to a potential difference close to $V_{MAX}$ whilst the unselected cells will be at zero potential difference, the cells within a pair of cells connected to the same transistor of course being either both selected or both unselected.

It will be seen that in the above address scheme the polarity of the voltages $\Delta V_A$, $\Delta V_B$ applied across each chosen cell in alternate on-cycles is reversed, this preventing degradation of the liquid crystal due to electrolysis.

It will be appreciated that by virtue of the two cells connected to each transistor in a display in accordance with the invention, the capacitance to be charged by each transistor is a quarter of that in a comparable prior art display with the same resolution. This enables the use of transistors with lower on-currents, for example amorphous silicon thin film transistors.

Figure 5:
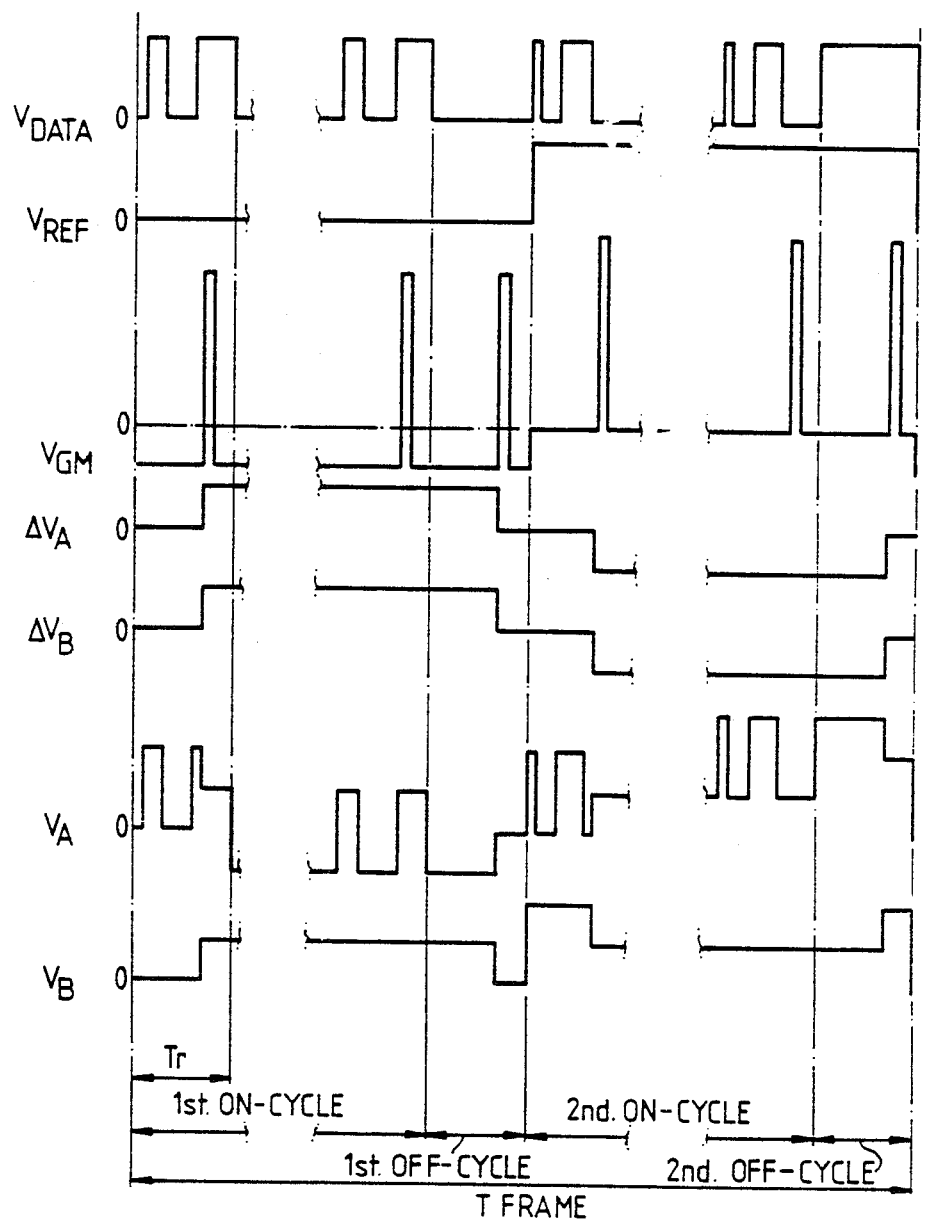
FIG. 5 illustrates a second voltage waveform scheme applicable to the display.

Referring now FIG. 5, various other drive schemes for the display shown in FIG. 2 are of course possible. In FIG. 5 it will be seen that the strobe pulses $V_{GM}$ applied during the second on-cycle and second off-cycle are at a different dc level to the pulses $V_{GM}$ applied during the first on-cycle and first off-cycle. Furthermore $V_{REF}$ and $V_{DATA}$ within the second off-cycle are set at $2V_{MAX}$. Such an alternative drive scheme has the advantage over that described in relation to FIG. 4 that the maximum voltage difference between the gate of each transistor, and the corresponding cell electrodes carried on the same plate as the transistors is $3V_{MAX}$. It will be seen from FIG. 4 that the corresponding voltage is $4V_{MAX}$. Thus the transistor leakage current for the FIG. 5 scheme is less than for the FIG. 4 scheme, this being particularly important for displays incorporating polycrystalline silicon transistors, as the leakage current is a strong function of the gate-source and gate-drain voltages. Furthermore the reliability of the transistors will be higher due to the lower fields through the gate oxide.

Figure 6:
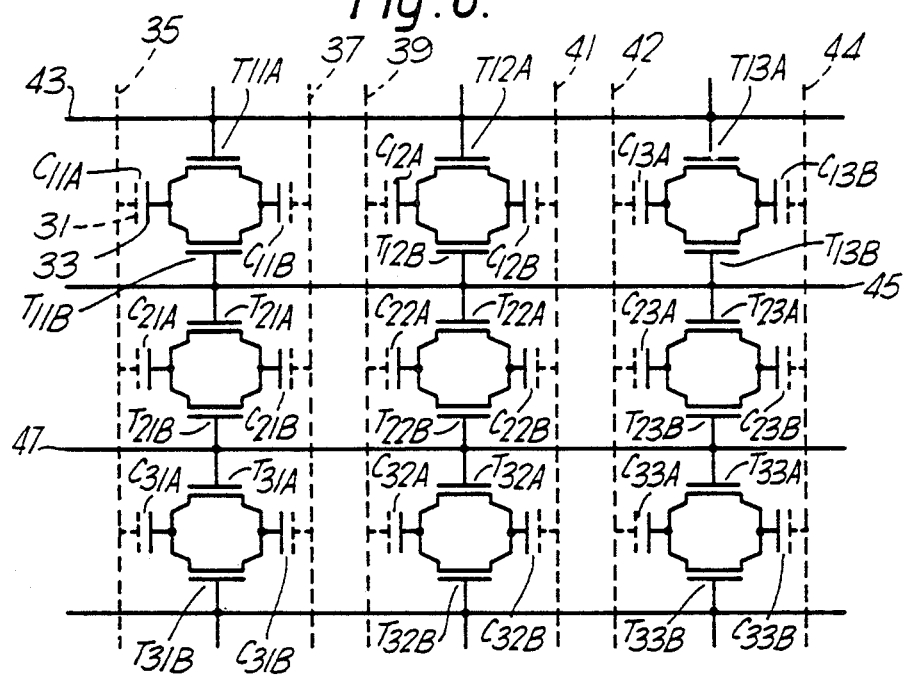
FIG. 6 is a schematic circuit diagram of part of the second display.

Referring now to FIG. 6 this figure illustrates the part of the second display to be described, the part comprising a three by three array of pixels, corresponding components of each of the further displays to be described being labelled as in the first display in accordance with the invention described herebefore. The array is, as before connected to gate address lines 43, 45, 47 carried on the first plate, and reference and data address lines 35, 37, 39, 41, 42, 44 carried on the second plate, appropriate driver circuits (not shown) being provided to provide the required voltages across the address lines. The second display is however distinguished from the first display in that each pair of cells for example C11A, C11B within a pixel is addressed by two transistors T11A, T11B whose gates are driven by adjacent gate lines 43, 45 as shown in the figure. Thus in operation of the second display, as for example the gate line 45 is strobed by the pulses $V_{GM}$, the sets of four cells C11A, C11B, C21A, C21B etc., in the pixel rows above and below the gate line 45 will be charged to the same valves by application of appropriate data and reference voltage waveforms to the source and drain lines, these being chosen such that the upper pixel row is addressed in the desired manner. The lower pixel row will then be reset and addressed in the desired manner for that row when the next gate line 47 is strobed. It will be appreciated that the uppermost and lowermost rows of transistors within the array will be exceptional in that they have gate lines devoted to themselves.

The address schemes required for this second display will be evident to those skilled in the art of matrix address displays in view of the schemes as disclosed in FIGS. 4 and 5 described herebefore, in conjunction with those disclosed by Takeda et al in Japan Display 86, pages 204–7, published in 1986.

It will be appreciated that the advantage of the arrangement shown in FIG. 6 lies that if a transistor is faulty, and is disconnected by for example laser cutting, the cells connected to that transistor will still be charged to a definite value. If the upper transistor within a pixel, for example T21A has to be disconnected, the cells C21A, C21B will be charged to the correct valve. If the lower transistor within a pixel, for example T21B is disconnected however, the cells will be charged to the valve of the cells C11A, C11B in the next row above: this is nevertheless not so disturbing to an observer of the display as an obvious inactive pair of pixels. The disturbance may be further reduced by having an arrangement of driver circuits such that the gate lines are first strobed in order working down the display (--- 43, 45,47 --) and then strobed in order working up the display (-- 47, 45, 43 --) with the result that cells connected to disconnected transistors are only charged wrongly in alternate frames.

Figure 7:
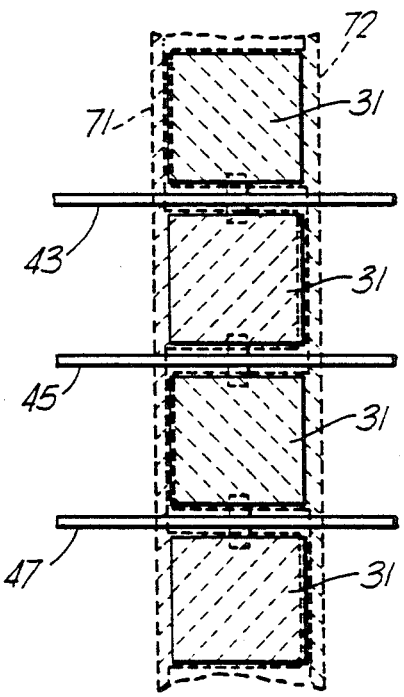
FIG. 7 is a schematic view of a first circuit element configuration of the third display.

It will be appreciated that in both displays in accordance with the invention described herebefore each pair of cells connected to the same transistor or transistors are charged to be the same potential. In some applications however, one may choose that the cells within each pair are of different shapes such that the difference in capacitance between the two cells results in a different partition of the voltages across the two cells. Alternatively where the cells within each pair be identical, but it is required that the cells within each pair are charged to different valves, the arrangement shown in FIG. 7 may be used. This arrangement is an adaptation of the display shown in FIG. 6 in that each pair of cells within a pixel is addressed by two transistors whose gates are driven by adjacent gate lines. This third display is however distinguished from that shown in FIG. 6 in that the pairs are arranged vertically and chained together into columns by the transistor source-drain channels. In this way each cell is connected to a unique combination of two transistors by their main electrodes. The third display is also distinguished from that shown in FIG. 6 in that the column address lines 35, 37, 39, 41 are replaced by respective pairs of meandering electrodes 71, 72 carried on the second plate, each electrode 71, 72 connecting alternate cell electrodes 31 on the second plate, the electrodes 71, 72 thus being interleaved as indicated in FIG. 7. These electrodes will generally be fabricated with fine metal stripes, typically of aluminium, so as to provide adequate conductivity between the cell electrodes 31. In use of this third display, as the respective strobe pulses $V_{GM}$ are applied to the successive gate lines 43, 45, 47, the pairs of cells in the rows on either side of the strobed gate line will be charged to the desired valve for the upper row of cells, the lower row of cells being reset to the correct valve when the next gate line down is strobed.

Figure 8:
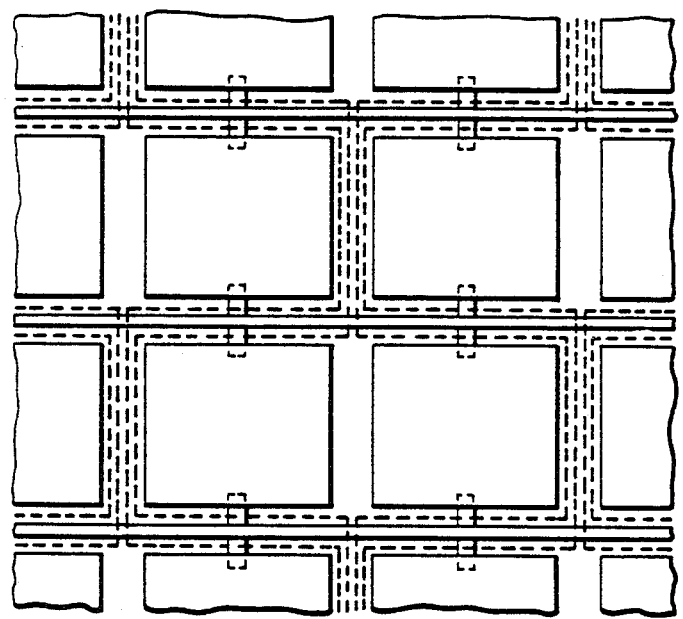
FIG. 8 is a schematic plan view of a circuit element configuration of a first adaptation of the third display.
Figure 9:
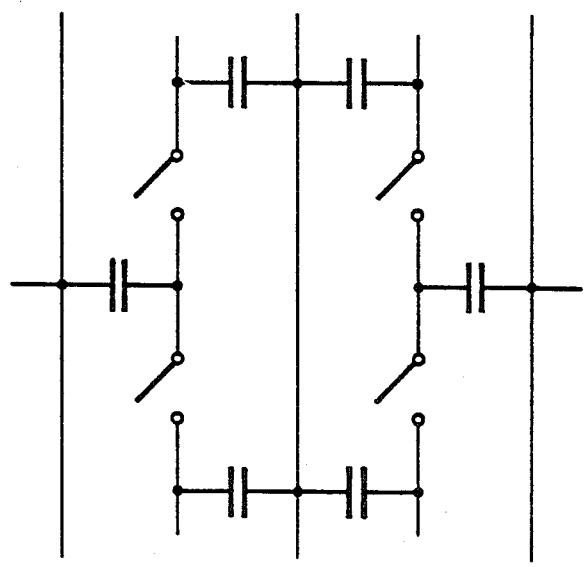
FIG. 9 is an equivalent circuit of the circuit element configuration illustrated in FIG. 8.
Figure 10:
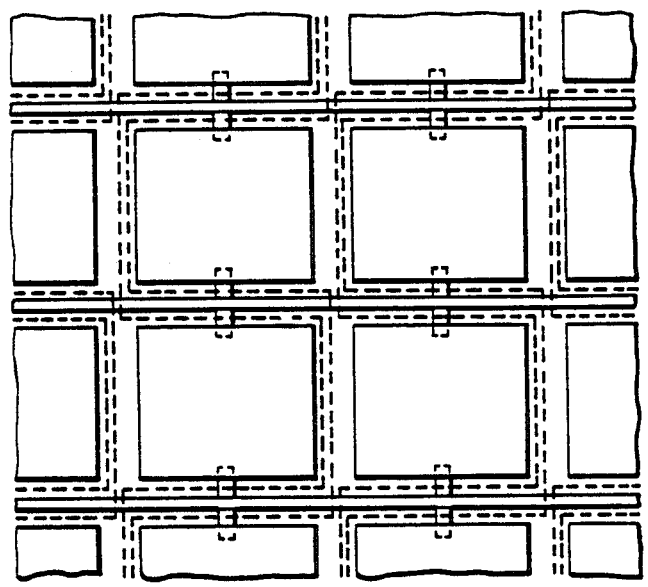
FIG. 10 is a schematic plan view of the circuit element configuration of a second adaptation of the third display.
Figure 11:
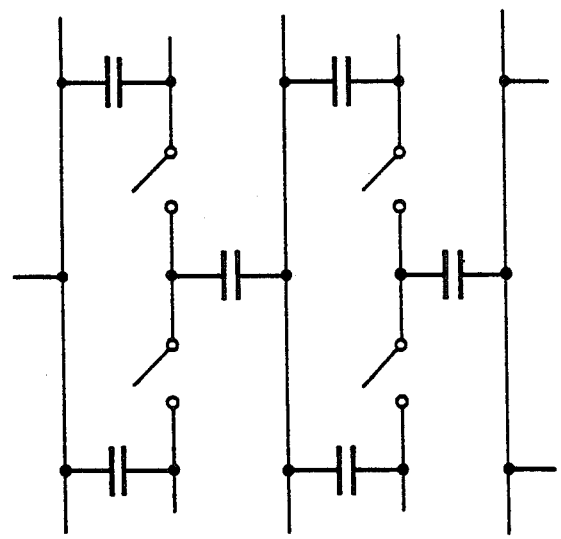
FIG. 11 is an equivalent circuit of the circuit element configuration illustrated in FIG. 10.
Figure 12:
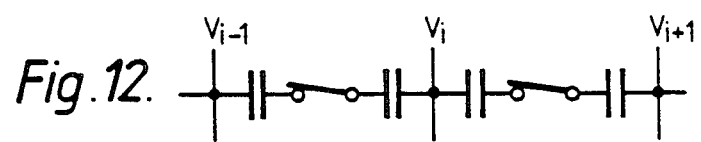
FIG. 12 is an equivalent circuit diagram illustrating a row across the first and second adaptations of the third display when the row is strobed.

It will be seen that a disadvantage of the arrangement shown in FIG. 7 is that the gaps between each column of cells must be relatively large in order to accommodate the two interleaving tracks. These gaps may be reduced somewhat by having a slightly zigzag arrangement of the columns of pixels but the appearance this creates may not be acceptable to the user. FIGS. 8 and 10 show two alternative arrangements of interleaved electrodes on the second plate in which these gaps are reduced. The corresponding equivalent circuits are shown in FIGS. 9 and 11 in which each cell is again shown as a capacitor and each transistor is shown as a switch, it being understood that all switches in a row are operated simultaneously as each gate line is strobed. In either of these arrangements, when one row is strobed (i.e. all the switches in that row are closed) the circuit to be addressed is equivalent to that shown in FIG. 12. The addressing scheme required here is different to that used in the arrangements described above. The voltages applied to successive column i.e. second plate electrodes $V_i$ ($i=0,1,2,3$ ---N) wherein N+1 is number of column electrodes, given by the algorithm $V_i = Vb_i$ $b_i = a_i \oplus b_{i-1}$ where V is a reference voltage and $a_i$, are $b_i$ are binary digits, $a_i$ being 1 or 0 according to whether the capacitor pair preceding column i is to be charged or not, respectively, and $\oplus$ denotes addition modulo 2 (exclusive OR). In order to ensure absence of DC voltage across the cells, each frame consists of two fields identical except that the bit $b_o$ is taken as 0 in one field and 1 in the other.

It will be evident that one disadvantage of the arrangements shown in FIGS. 8 and 10 is that it is difficult to display grey scale by varying the voltages on the cells so that they may assume intermediate values.

Figure 13:
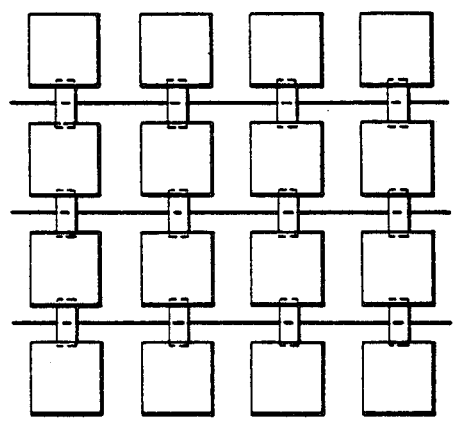
FIG. 13 illustrates the arrangement of the circuit elements carried on the first plate of a third adaptation of the third display.
Figure 14:
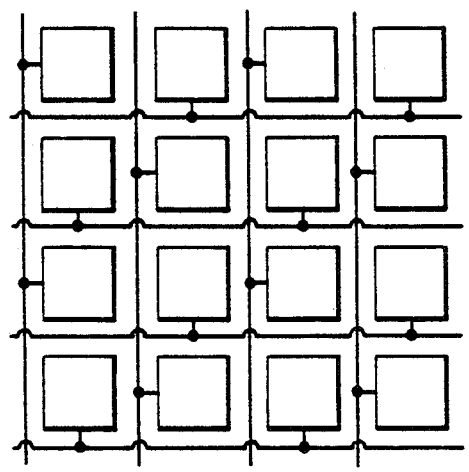
FIG. 14 illustrates the arrangement of the circuit elements carried on the second plate corresponding to the adaptation of the third display shown in FIG. 13.
Figure 15:
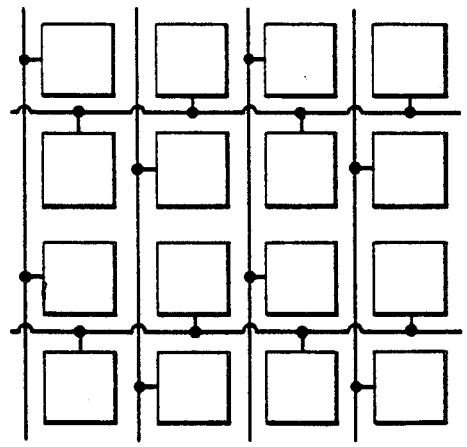
FIG. 15 illustrates an alternative arrangement of the circuit elements carried on the second plate to that shown in FIG. 14.

These arrangements are therefore primarily suitable for alphagraphic displays. One preferred approach which avoids this difficulty is to have the source and drain lines carried on the second plate arranged as orthogonal sets with insulated crossovers. Although this increases the likelihood of faults in the second plate, this plate can be tested prior to assembly and, since it is the cheaper of the two, some wastage of the second plate alone may be economically acceptable. FIG. 13 shows the arrangement of transistors and cell electrodes 33 on the first while FIGS. 14 and 15 show two possible connectivities for the second plate. In both cases the display may be addressed by applying waveforms of the types shown in FIGS. 4 and 5 as $V_{DATA}$ to the column electrodes on the second plate and waveforms of the types shown as $V_{REF}$ to the horizontal electrodes on the second plate.

Figure 16:
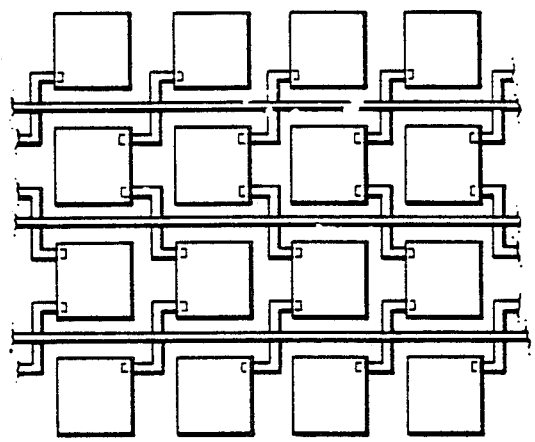
FIG. 16 illustrates the arrangement of the circuit elements carried on the first plate of a fourth adaptation of the third display.
Figure 17:
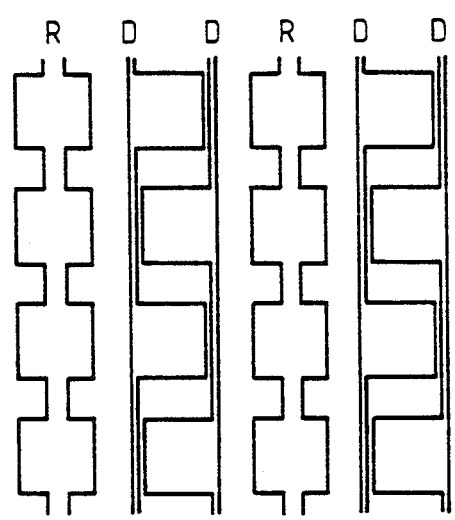
FIG. 17 illustrates the arrangement of the circuit elements carried on the second plate for the fourth adaptation of the third display illustrated in FIG. 16.

It will be evident that in all of the arrangements shown in FIGS. 7 and 15 the members of a pair of cells connected by a transistor are arranged vertically, with both cells being initially charged to the required potential for the upper cell and the lower cell then being reset to the required potential in the next strobe interval. Another alternative is to connect the cells within such pairs of the cells diagonally. FIG. 16 shows a possible arrangement for the first plate and FIG. 17 the corresponding second plate arrangement, with D and R denoting electrodes which are driven with data and reference waveforms, respectively, indicated in the schemes of FIGS. 4 and 5.

It will be evident that in all of the arrangements shown in FIGS. 7 to 17 the lowest row of the array will remain set at the same valve as the lowest but one unless special circuitry is provided for that row alone. Alternatively the lowest row may be masked from the user by a frame or bezel. It will also be evident that for the arrangement shown in FIGS. 16 and 17 alternate pixels in the first and last columns, these not being shown in the figures, must either be omitted or provided with special circuitry.

Figure 18:
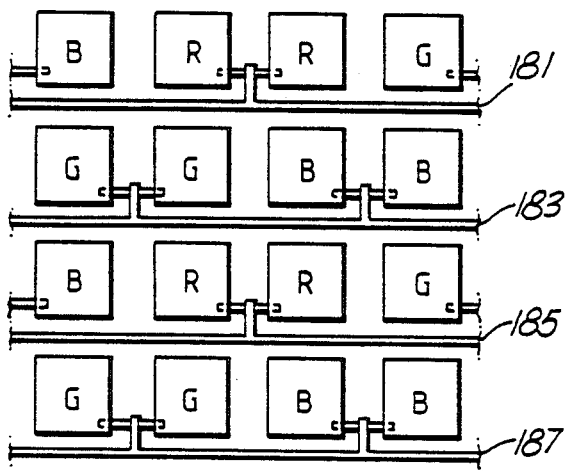
FIG. 18 illustrates the arrangement of the circuit elements carried on the first plate of the fourth display.
Figure 19:
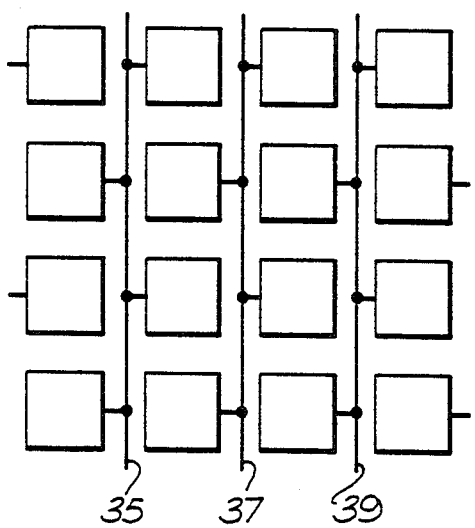
FIG. 19 illustrates the arrangement of the circuit elements carried on the second plate of the fourth display.

Referring now to FIGS. 18 to 22, in order to produce a colour display of the type described, for example by Saito el al in the 1985 International Display Research Conference Proceedings, pages 27–29, each pixel of the matrix addressable display is divided into a triad of red, green and blue subpixels. FIGS. 18 and 19 illustrate such a display in accordance with the invention. FIG. 18 shows part of the first plate which carries the transistors and associated gate lines 181, 183, 185, 187, each electrode 33 carried by the first plate within a pair of cells which are connected to the same transistor being associated with a respective colour filter of the same colour, red denoted R, green denoted G or blue denoted B. Each transistor within successive rows is displaced by half a subpixel. FIG. 19 shows a corresponding part of the second plate which carries the electrodes 31 together with the source and drain column electrodes, it being seen that each column electrode is connected alternately to cells associated with filters of two different colours along each column.

Figure 20:
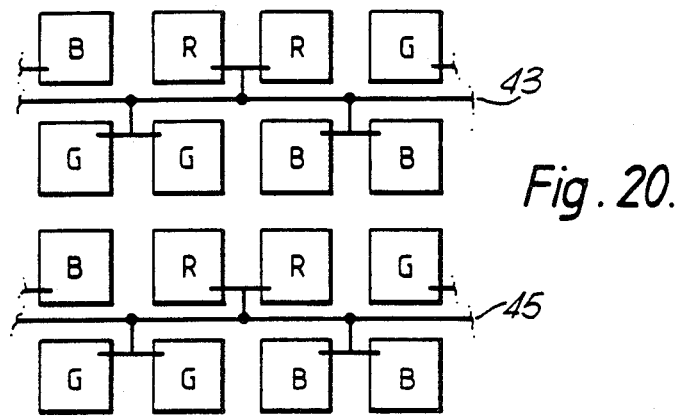
FIG. 20 illustrates the arrangement of the circuit elements carried on the first plate of the fifth display.
Figure 20:
Figure 21:
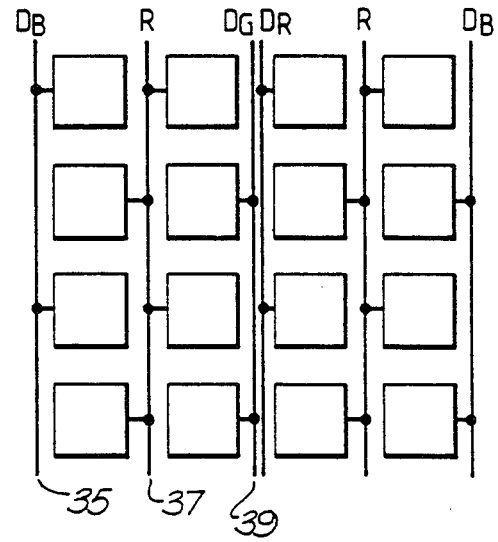
FIG. 21 illustrates the arrangement of the circuit elements caried on the second plate of the fifth display.
Figure 22:
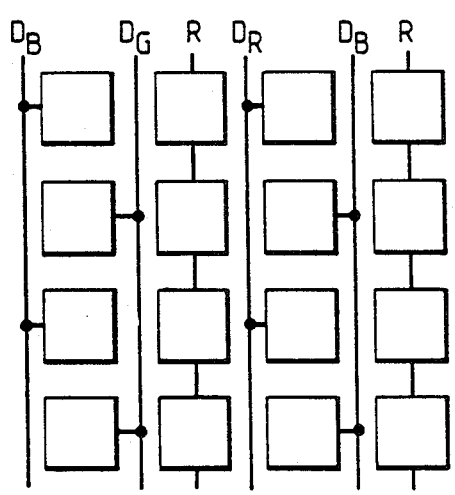
FIG. 22 illustrates an alternative arrangement of circuit elements carried on the second plate of the fifth display.

A disadvantage of the arrangement shown in FIGS. 18 and 19 is that the whole of any one red/blue triad is not addressed with a single strobing on the respective gate lines. FIG. 20 shows an alternative circuit component arrangement of the first plate which avoids this difficulty, two alternative arrangements for the corresponding second plate being shown in FIGS. 21 and 22. It will be seen from these figures that by applying voltage waveforms as shown to the column electrodes carried on the second plate the whole of the any red/green/blue triad may be addressed within a single strobing interval. In the FIGS. $D_R$, $D_G$ and $D_B$ denote voltage data waveforms for red, green and blue respectively which are applied to the nominal transistor source lines, whilst R denotes the reference voltages applied across the nominal drain lines. The waveforms will be similar to those shown in FIGS. 4 and 5 with respect to the first display in accordance with invention described herebefore.

It will be appreciated that the precise form of a display in accordance with the invention will depend on the application. In particular whilst the display described herebefore are contained between a pair of insulating transparent plates, for example glass, one plate may take the form of a semiconductor crystal, the transistors being integrated within this crystal.

It will be appreciated that a capacitance other than a cell of the display may be used to isolate each main electrode of the transistors from the rest of the array. Such as arrangement however will not be as advantageous as a display in accordance with the invention.

It will be appreciated that whilst it is particularly convenient to use liquid crystal cells in a display in accordance with the invention, other forms of switchable cells may also be used. These include electroluminescent cells, PLZT and similar ferroelectrics, electrochromic cells, electrophoretic cells and vacuum switches.

It will also be appreciated that whilst the gate, source and drain address lines shown in the display in accordance with the invention described herebefore are either parrallel or orthogonal to each other, this invention is also applicable to non-rectangular arrays, in which the address lines take, for example, a radial configuration for use in analogue display for instrumentation.

We claim:

1. A matrix addressable display, comprising:
   (a) first and second substantially parallel plates;
   (b) an array of pairs of switchable cells, each cell having a first electrode carried on a surface of said first plate and a second electrode carried on a surface of said second plate;
   (c) a plurality of transistor means, each transistor means corresponding to a respective one of said cell pairs and each having current carrying main electrodes and a control electrode, said transistor means being carried on said first plate and its main electrodes being coupled between said first electrodes of said respective cell pair;
   (d) a plurality of control lines carried on said first plate, each said control line being coupled to a said control electrode of at least one said transistor means;
   (e) a plurality of pair lines to receive a data voltage therebetween, said lines being carried on said second plate, each data voltage receiving line being coupled to said second electrode of a respective cell of at least one pair of cells; and
   (f) means to address said pairs of cells selectively by applying said data voltage between the pair of data voltage receiving lines corresponding to a selected pair of cells and by applying a control voltage to the control line corresponding to said selected pair of cells to render the corresponding transistor means conductive, thereby coupling the selected pair of cells in series between the corresponding pair of data voltage receiving lines.

2. A display according to claim 1, in which each cell is a liquid crystal cell.

3. A display according to claim 1, in which said means to address said pairs of cells is operative to periodically reverse the polarity of said voltages applied between said data voltage receiving lines.

4. A display according to claim 3, in which said means to address said pairs of cells includes means to apply a reference potential to one line of said pair of data voltage receiving lines; and in which said reference potential is periodically pulsed so as to cause said period reversal of polarity.

5. A display according to claim 1, including drive means for applying drive voltages effective to reduce the voltages between said main electrodes of each said transistor means after switching of said cells.

6. A display according to claim 5, in which strobe pulses are applied sequentially to control electrodes of said transistor means to render the transistor means conductive; and in which the do level of said strobe pulses varies within each sequence so as to reduce the voltages between each said main electrode and said control electrode of each said transistor means.

7. A display according to claim 1, in which each cell is connected to two transistor means the main electrodes of which are connected to the same pair of data voltage receiving lines.

8. A display according to claim 1, including means for applying different voltages across each pair of said cells which are connected to the same transistor means.

9. A display according to claim 8, in which each cell within each said pair of cells is of different dimensions from the other cell.

10. A display according to claim 8, in which each said cell is connected to a said main electrode of a different one of said transistor means.

11. A display according to claim 10, in which data voltage receiving lines connected to said main electrodes of said transistors means comprise two individual conductive tracks, each said being connected to alternate cells along said array.

12. A display according to claim 11, in which said two conductive tracks extend in different directions across said array.

13. A display according to claim 1, wherein said voltages applied between said data voltage receiving lines are variable to enable partial switching of said cells.

14. A display acording to claim 1, in which the pairs of cells are arranged in rows and columns; and in which each pair of cells connected to the same transistor means lie within the same column or the same row of said array.

15. A display according to claim 1, in which the pairs of cells are arranged in rows and columns; and in which each said pair of cells connected to the same transistor means lie within different columns and different rows of said array.

16. A display according to claim 1, in which each said cell is associated with a colour filter.

17. A display according to claim 16, in which each cell within a trio of cells assosiated with a filter of a different primary colour.

18. A display according to claim 17, in which said means to address said pairs of cells is so arranged that the cells within said trio of cells may be addressed simultaneously.

19. A display according to claim 1, including screening means around peripheral regions of said display effective to screen cells within said array which are not addressable independently of all other cells within said array.

* * * * *